No. 621,693. Patented Mar. 21, 1899.
G. W. MORRIS.
WATER HEATER.
(Application filed Mar. 30, 1898.)
(No Model.)
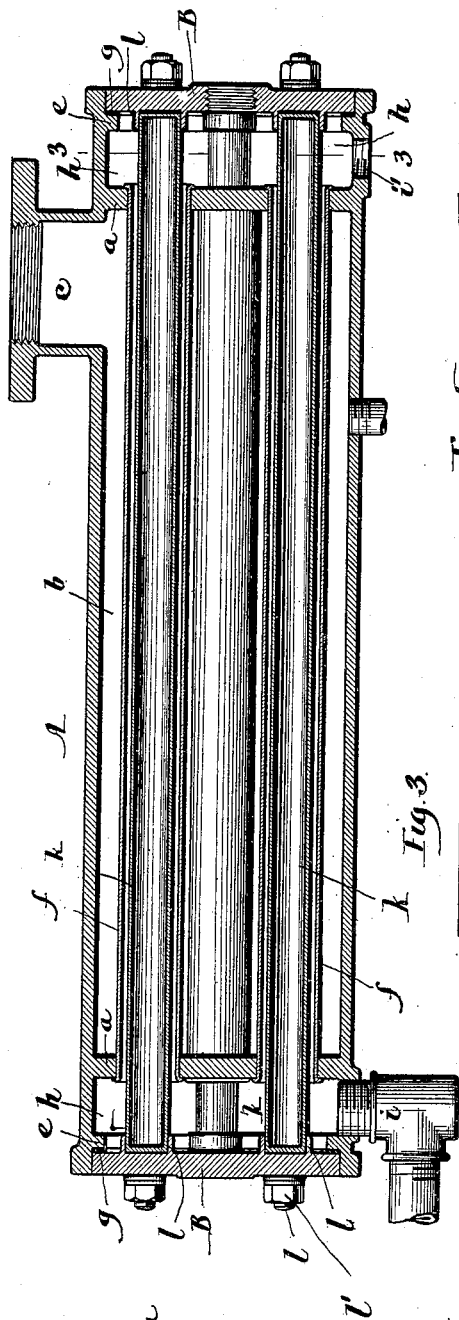
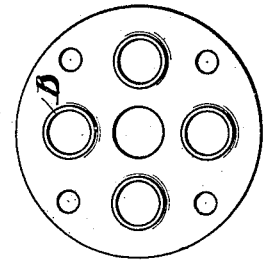
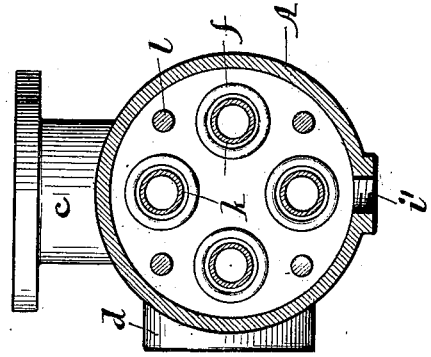
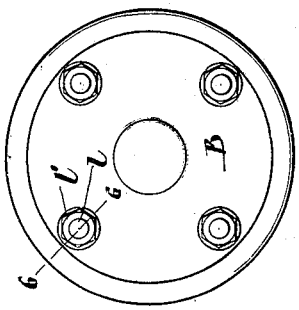
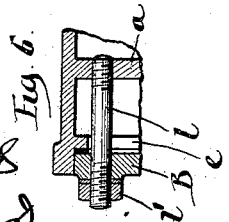
Witnesses:
Inventor:
George W. Morris
By Benice & Fisher
Attorneys.

UNITED STATES PATENT OFFICE.

GEORGE W. MORRIS, OF RACINE, WISCONSIN, ASSIGNOR TO THE J. I. CASE THRESHING MACHINE COMPANY, OF SAME PLACE.

WATER-HEATER.

SPECIFICATION forming part of Letters Patent No. 621,693, dated March 21, 1899.

Application filed March 30, 1898. Serial No. 675,666. (No model.)

*To all whom it may concern:*

Be it known that I, GEORGE W. MORRIS, a resident of Racine, in the county of Racine, State of Wisconsin, have invented certain new and useful Improvements in Water-Heaters, of which I do declare the following to be a full, clear, and exact description, sufficient to enable others skilled in the art to make and use the same.

The invention aims to provide an apparatus simple in structure, easily cleansed, and capable of effective use to quickly heat the feed-water circulating therein by exposing the water in film-like masses to the influence of the spent or other steam used for the heating medium. The details of structure employed for one form of the apparatus will appear from the description following, and the improvements be more clearly pointed out by the claim at the conclusion.

On the drawings like parts have like designation.

Figure 1 is a view of the improved heater in central longitudinal section; Fig. 2, a view in end elevation; Fig. 3, a cross-section view at line 3 3 of Fig. 1; Fig. 4, an inside elevation view of one of the end lids or covers of the heater; Fig. 5, a cross-section view thereof; and Fig. 6 a detail section view at line 6 6, Fig. 2.

The shell A of the heater is conveniently cast of cylindric form, having opposite tube-sheets $a$, which extend across the shell near its ends and inclose the steam-chamber $b$. An inlet-port $c$ establishes the main chamber in communication with the spent steam from the engine or other suitable source of steam-supply, and an outlet-port $d$ allows the steam to escape after it has circulated within the chamber. Extended between tube-sheets $a$ is a series of tubes $f$, expanded and beaded over to form tight joints with the sheets, as in steam-boiler practice.

At its opposite terminals shell A has inset ledges $e$, against which the covers B are seated. Gasket $g$ interposed between each ledge and cover, closes the joint. When the covers are in place, they complete the water-chests $h$ at the ends of the apparatus. These chests communicate, respectively, with the inlet $i$ and outlet $i'$ for the circulating water. Studs $l$, Fig. 6, project from tube-sheets $a$ through covers B, and by aid of nuts $l'$ thereon the covers are drawn to a tight seat. The usual follower and packing washers are interposed beneath the nuts.

Through tubes $f$ extend a series of space-pipes $k$, closed at their ends and held in sockets formed upon covers B. The sockets are nicely located, so that each internal space-pipe $k$ is held centrally within the bore of tube $f$, thus providing an intermediate water-passage between the pipe and the tube, which is of the same dimension at all points. The tubes $k$ by being closed at one or both ends or at some intermediate point obstruct the flow of liquid through them. Space-pipes $k$ being somewhat less in diameter than the bore of flues $f$, it is manifest that the water-supply which enters chest $h$ through inlet $i$ must pass lengthwise of the apparatus in thin films established between pipes $k$ and tubes $f$. The water is thus minutely exposed to the influence of the steam and emerges at the chest $h$ and exit $i'$ markedly raised in temperature.

If it be desired to cleanse the apparatus, the removal of nuts $l'$ at one end releases adjacent cover B and permits the immediate withdrawal of space-pipes $k$, thus exposing the water-chest $h$ and internal flues $f$ to ready access for cleansing or repairs. When the work is completed, the nest of space-pipes $f$ can be replaced and the cover B be again set and fastened in position. Unless desired the opposite head need not be removed during the cleaning. This is frequently a great advantage, since it enables the heater to be cleaned from one end only without disconnecting or taking down the main shell of the heater.

Obviously the details of the structure can be varied according to the mechanic's skill without departure from the essentials of the invention.

Having thus described my invention, what I claim as new, and desire to secure by Letters Patent, is—

In water-heaters, the combination with the main body or hollow shell having suitable inlet and outlet and opposite tube-sheets extended across the shell leaving terminal chambers beyond them, of the series of open tubes secured in said cross-sheets, the outer end lids covering the terminal chambers, the closed space-pipes projected through the open tubes and removably socketed in internal seats on the lids, and suitable means for holding said lids and pipes to place, substantially as described.

GEORGE W. MORRIS.

Witnesses:
 RICHD. ROBINSON,
 FREDERICK ROBINSON.